United States Patent [19]

Kiwak et al.

[11] Patent Number: 4,598,457

[45] Date of Patent: Jul. 8, 1986

[54] METHOD OF CONSTRUCTING A BRAKE PEDAL

[75] Inventors: Robert S. Kiwak, Ellicott City, Md.; Tung Liu, Granger, Ind.

[73] Assignee: Allied Corporation, Morristown, N.J.

[21] Appl. No.: 769,219

[22] Filed: Aug. 26, 1985

[51] Int. Cl.$^4$ ............................................. B23P 17/00
[52] U.S. Cl. ........................................ 29/411; 29/417; 29/432; 29/505; 74/512; 264/209.1; 264/210.1; 264/249
[58] Field of Search ............... 29/432, 411, 417, 412, 29/505; 264/249, 173, 210.1, 177 F, 176 F, 209.1; 74/512

[56] References Cited

U.S. PATENT DOCUMENTS

| | | | |
|---|---|---|---|
| 2,946,727 | 7/1960 | Wellington | 29/411 X |
| 3,581,378 | 6/1971 | Jozens | 29/432 X |
| 4,009,623 | 3/1977 | Smith et al. | 74/512 |
| 4,043,217 | 8/1977 | Kleist | 74/512 X |
| 4,151,242 | 4/1979 | Sansone | 264/209.1 X |
| 4,291,453 | 9/1981 | Mathieu | 29/417 |
| 4,300,409 | 11/1981 | Leighton | 74/512 |
| 4,305,703 | 12/1981 | Lupke et al. | 264/209.1 X |
| 4,490,316 | 12/1984 | Satzler | 264/209.1 X |

*Primary Examiner*—Charlie T. Moon
*Attorney, Agent, or Firm*—Leo H. McCormick, Jr.; Ken C. Decker

[57] ABSTRACT

A method of constructing a brake pedal comprises the steps of generating a continuous tubular member (18) by pultruding a thermoplastic or B staged thermosetting plastic resin through a die (16), attaching cross members (26 and 28) to the continuous tubular member (18), cutting the continuous tubular member (18) into segments (30 ... 30$^N$) of predetermined length, and deforming each segment (30 ... 30$^N$) to substantially define a pedal (60). The resin carries strands (14) and the segments (30 ... 30$^N$) are exposed to heat and pressure to permanently set the shape of the pedal (60). The cross members (26 and 28) are used to pivotally secure the brake pedal (60) to a vehicle in its installed position and also to connect the brake pedal (60) to an input member for a master cylinder or brake booster assembly.

4 Claims, 5 Drawing Figures

METHOD OF CONSTRUCTING A BRAKE PEDAL

BACKGROUND OF THE INVENTION

A brake pedal is pivotally secured to a portion of a vehicle frame to permit a vehicle operator to pivot the pedal by foot operation. The pedal also connects with a brake pressure generator such as a master cylinder to effect a brake application when the pedal is pivoted relative to the frame.

Heretofore, each brake pedal was constructed from a single piece of metal that was subjected to separate stamping operations to deform the metal to the desired configuration. In addition, a pad was welded to the deformed metal to form a foot stop or pedal for the vehicle operator during a brake application.

SUMMARY OF THE INVENTION

The present invention relates to a method of constructing a brake pedal. A thermoplastic or "B" staged thermosetting plastic resin carrying a fiber strand is pultruded through a die and exposed to heat to form a continuous tubular member. A plurality of cross members are attached to the continuous tubular member and the latter is cut into segments of predetermined length. Each segment is deformed to substantially define a bent end offset from a longitudinal body portion and the bent end is further deformed to substantially define a foot pedal.

During pultrusion the continuous tubular member is partially cured (if a thermosetting plastic is used) to permit attachment of the cross members. When a thermoplastic resin is used the continuous tubular member is merely softened by heat. The cross members are impacted against the continuous tubular member so as to project therethrough. After the foot pedal is formed, the segment is permanently set by suitable means. In order to deform the segment to define the bent end and the foot pedal, the segment is subjected to heat and pressure.

It is a primary object of the present invention to construct a brake pedal from a continuous tubular member of thermoplastic or "B" staged thermosetting plastic material.

It is a primary object of the present invention to construct a brake pedal from a continuous tubular member of thermoplastic or formable thermosetting plastic material.

It is a further object of the present invention to construct a brake pedal of lightweight construction by a continuous method.

DETAILED DESCRIPTION

Figure 1:
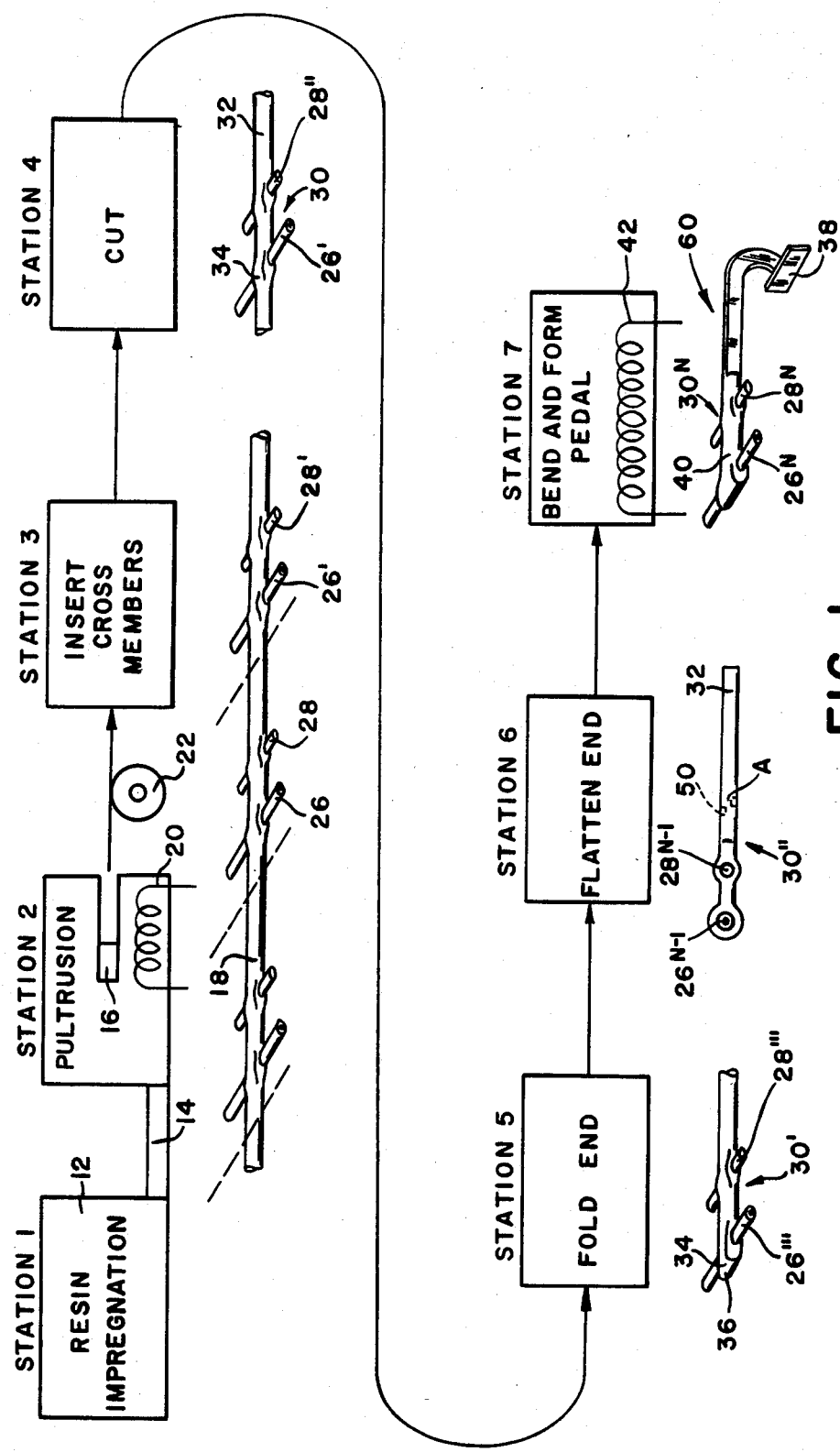
FIG. 1 shows a schematic illustration of the method used to construct the brake pedal.
Figure 2:
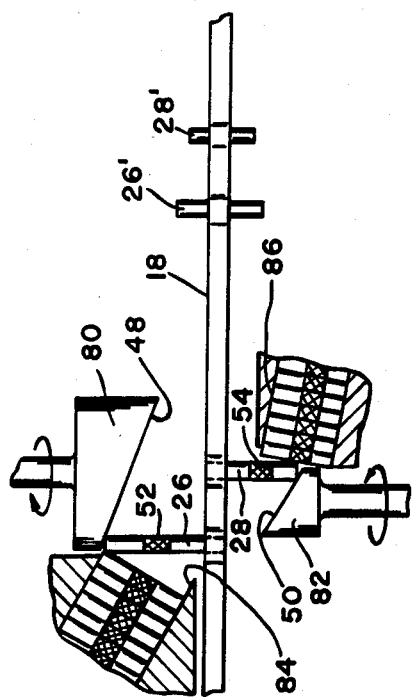
FIG. 2 illustrates a machine for inserting cross members into the tubular member.

As shown in FIG. 1, a thermoplastic or "B" staged thermosetting material is impregnated with a fiber strand at station 1. A container 12 holds the impregnated resin and a conduit 14 communicates the impregnated strands to station 2 wherein the impregnated strands are pultruded through a die 16 to form a continuous tubular member 18. The tubular member 18 is softened at station 2 by means of a heating element 20. A pulley 22 or other suitable gripping means receives the continous tubular member 18 and acts on the same to pull it through the die 16, as well as directing it to station 3. At station 3 as best shown in FIG. 2, cross members 26 and 28 are impacted against the tubular member 18 so as to extend therethrough. Rotary presses 80 and 82 are turning at the same rate as pulley 22. Slots 84 and 86 that hold pins 26 and 28 in presses 80 and 82, respectively, is synchronized such that the length between successive insertions into tubular member 18 is substantially the same. As presses 80 and 82 rotate, cam surfaces 48 and 50 and move the pins 26 and 28 completely through the tubular member 18. As shown in FIG. 2, the pins 26 and 28, each have an irregular or knurled surface 52 and 54 thereon. The thermoplastic material is pliable at station 3, and is such that some of the material flows into the knurled area to aid in defining a mechanical bond between the pins 26 and 28 and tubular member 18 when the thermoplastic material is cured. In particular, pivot pin 26 is designed to be attached to a hanger in a vehicle and the pin 28 is a tube or connecting pin for attaching a push rod to a master cylinder.

At station 4 the continuous tubular member 18 is cut into segments 30 of predetermined length. From station 1 to station 4, the tubular member 18 is a continuous member, while thereafter each segment 30 is operated on separate from the other segments $30' \ldots 30^N$. Each segment 30, $30' \ldots 30^N$ has a first end 32 free of cross members and a second end 34 receiving one of the pins 26 and 28.

Figure 3:
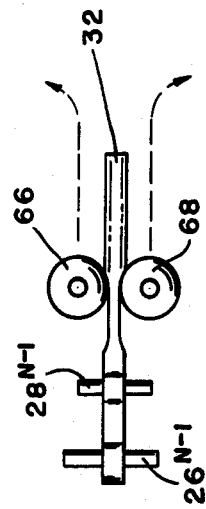
FIG. 3 illustrates a machine for flattening the end of the tubular member.

Next, the segment 30' is moved to station 5 wherein the second end 34 is folded at 36 to encircle the pivot pin or cross member 26, thereby disposing the latter at the extremity of the second end 34. At station 6, as illustrated in FIG. 3 the first end 32 is flattened on moving through rollers 66 and 68.

As illustrated in phantom at 50 of station 6 the fiber strand of segment 30 is pultruded to form a matrix having an angle A between overlapping strands. Preferably the angle A is substantially equal to 30° but can be as large as 45°. End 32 is substantially rectangular in shape with the major axis perpendicular to the pivot pin 26. Thus, more strength is provided for receiving an input force which is transmitted through push rod pin 28.

Figure 4:
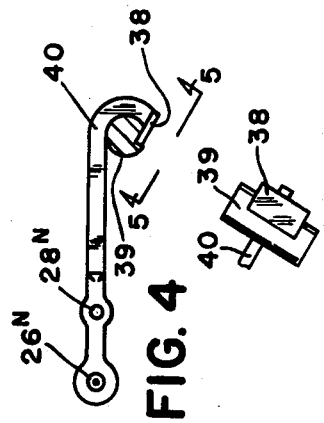
FIG. 4 illustrates a machine for bending and forming the pad section of the brake pedal from the flattened end.
Figure 5:
FIG. 5 is a sectional view taken along line 44 of FIG. 4.

At station 7 the flattened end is bent and deformed to form a pedal pad 38. As illustrated in FIGS. 4 and 5, pad 38 is offset from a longitudinal body portion 40 of segment 30. Die 39 is heated and when a force is applied to end 32, the thermal setting plastic material is extended to fill the die and form pedal 38.

After station 7, the deformed segment 30 is fully cured via heating element 42 to develop the optimum properties for the thermoplastic or "B" staged thermosetting plastic material.

In a preferred embodiment the tubular member 18 is made from either nylon polyester, vinylester or epoxy, and the fiber strand is either glass or graphite.

Although seven stations are shown in FIG. 1, it is possible to combine operations to decrease the number of stations. For example, stations 5 and 6 can be combined into a single station wherein the end 34 is folded and the end 32 is flattened simultaneously. In addition, stations 3 and 4 can be combined so that the cross members are attached to the tubular member at the same time the latter is being cut into segments of predetermined length.

The brake pedal 60 shown at station 7 is ready for installation into a vehicle. The cross members or pins $26^N$ and $28^N$ are adapted for pivotally mounting the brake pedal 60 to a frame of the vehicle and for connecting via a push rod with a master cylinder. The cross members could be reversed in location to accommodate pivoting of the brake pedal about either cross member.

The method disclosed herein provides for the construction of a continuous tubular member having cross members. The continuous tubular member is cut into segments of predetermined length and each segment is deformed to define a brake pedal. By using a fiber reinforced formable plastic to form the brake pedal a continuous process can be employed, to generate a lightweight and strong construction.

We claim:

1. A method for constructing a brake pedal having one end adapted for pivotal anchoring and the other end substantially defining a pedal cooperating with a foot during a brake application, said method comprising:
   (a) generating a continuous tubular member of thermoplastic material;
   (b) attaching a plurality of cross members to said continuous tubular member by impacting said plurality of cross members against said continuous tubular member to extend therethrough;
   (c) cutting said continuous tubular member into segments containing an equal number of cross members;
   (d) deforming one end of each segment to substantially define the pedal; and
   (e) folding the other end of each segment to substantially encircle one of said cross members.

2. The method of claim 1 in which each of said segments is provided with two cross members.

3. The method of claim 1 in which said continuous tubular member is heated prior to the attachment of said plurality of cross members to soften said continuous tubular member, and each of said segments is also heated after said other end is folded to cure each of said segments.

4. A method of constructing a brake pedal having one end adapted for pivotal anchoring relative to a vehicle frame and another end defining a pedal cooperating with a foot of a vehicle operator, said method comprising, generating a continuous member of thermoplastic material by pultruding fiber strands through a resin solution, attaching a plurality of cross members to said continuous member by impacting said plurality of cross members against said continuous member to extend completely therethrough, cutting said continuous member into segments containing an equal number of cross members, said equal number of cross members being disposed remote from one end of said segment, deforming said one end of each segment to substantially define said pedal, and folding the other end of each segment to substantially encircle one of said cross members.

* * * * *